Patented Feb. 21, 1939

2,147,834

UNITED STATES PATENT OFFICE 2,147,834

AZO DYESTUFFS

Ernst Fellmer, Gustav Mauthe, and Hermann Noerr, Leverkusen-I. G.-Werk, Germany, assignors to General Aniline Works, Inc., New York, N. Y., a corporation of Delaware No Drawing. Application August 18, 1937, Serial No. 159,708. In Germany August 21, 1936

6 Claims. (Cl. 8—13)

In our co-pending application Ser. No. 69,592, filed March 18, 1936, Patent No. 2,110,394, issued March 8, 1938, we have described and claimed leather dyed with mono- or disazodyestuffs of the general formula:

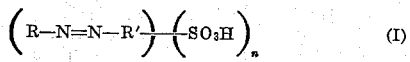    (I)

in which formula R—N=N— stands for the radical of an aromatic diazo compound or a diazoazo compound and R' stands for a 2-aminonaphthol coupling component or a substitution product thereof.

We have found that dyeings of similar kind may be obtained with mono- or disazodyestuffs of the general formula:

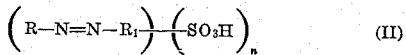    (II)

in which R—N=N stands also for the radical of an aromatic diazo compound or a diazoazo compound while $R_1$ stands for a 2-aminonaphthalene coupling component of the general formula:

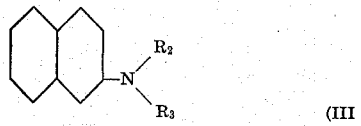    (III)

In the latter formula $R_2$ and $R_3$ designate hydrogen atoms or alkyl or aryl groups.

In the dyestuffs of the above formula (II) to be used in accordance with the present invention, R may for instance mean a radical of the benzene or naphthalene series which may be substituted. Suitable substituents are for instance halogen atoms, such as chlorine or bromine atoms, alkyl groups, such as the methyl or ethyl radicals, nitro groups, acylamino groups, alkoxy groups, such as the methoxy or ethoxy group.

R may further be substituted by an aryl azo group so that R—N=N— stands for a diazoazo group, such for instance as in the case of diazotized aminoazobenzene or diazotized aminoazobenzene-disulfonic acid.

In the aforementioned Formula III, illustrating $R_1$, one or both valences of the nitrogen atom may be linked to hydrogen atoms, alkyl or aryl groups. For instance $R_1$ may stand for 2-aminonaphthalene and N-mono- or dialkylated 2-amino-naphthalene, or for a 2-aminonaphthalene, in which for instance one hydrogen atom of the amino group is substituted by an aryl radical.

$R_2$ and $R_3$ can also denote substituted alkyl or aryl radicals. Thus $R_2$ and/or $R_3$ may represent an alkyl group substituted for instance by hydroxyl groups, which latter may, by way of example, be etherified. On the other hand $R_2$ or $R_3$ may stand for an aryl radical, which may be substituted for instance by nitro, alkyl, hydroxy, alkoxy, sulfonic or carboxylic acid groups, as well as halogen atoms.

Also the naphthalene ring system may bear substituents except hydroxyl groups.

Sulfonic acid groups may be present either in R or in $R_1$ or in both ring systems.

In dyeing chrome leather, it is desired not only to dye the surface of the leather, but also to give an even shade to the cut of the leather to a certain depth of penetration, while the zone of the cross-cut remaining undyed is intended to retain the pure greenish chrome color.

Of particular technical importance are dyeings of this kind on leathers, the grain side or flesh side of which is more or less ground off after the dyeing.

In acordance with the present invention the desired effect is attained to an excellent degree, when in the dyeing process mono- or disazodyestuffs of the above identified formula are used, the dyeing per se being performed according to the standard methods of dyeing leather, as is more fully described in the annexed examples. If desired the mono- or disazodyestuffs of the above identified formula can be used in mixture with other acid or substantive dyestuffs.

The invention is illustrated by the following example without being restricted thereto:

Example 100 kgs. of neutralized chrome calf leather are introduced into a drum with about 300 kgs. of hot water at 60° C. A dyestuff solution prepared from 1.5 kgs. of the dyestuff from diazotized 2-chloraniline and 2-naphthylamine-3.6-disulfonic acid and 40 kgs. of hot water is gradually added. After about 3 quarters of an hour the dyestuff has been absorbed. Stuffing of the leather is then effected. In this manner there is obtained a dyeing of a brownish-yellow shade, which exhibits on the grain side and on the flesh side a distinct dyeing of the cut, without changing or soiling the characteristic greenish color of the chrome leath- in the interior of the cut. Further, both the flesh and the grain side can be easily ground off, without producing a bad and non-uniform appearance by the standing out of undyed fibres.

The following table contains some further examples and the shades obtained on leather:

methyl and phenyl, and $n$ stands for a whole number.

| Diazotization component | Coupling component | Shade |
|---|---|---|
| 1-naphthylamine-3.6-disulfonic acid | 2-naphthylamine-5.7-disulfonic acid | Orange. |
| 1-naphthylamine-5-sulfonic acid | do | Reddish light brown. |
| Aniline-2.5-disulfonic acid | 2-naphthylamine | Orange-brown. |
| Metanilic acid | 2-methylaminonaphthalene-7-sulfonic acid | Yellowish orange. |
| p-Sulfanilic acid | Phenyl-2-naphthylamine-6-sulfonic acid | Brownish red. |
| 4-acetylethylamino-2-aminotoluene | 2-naphthylamine-3.6-disulfonic acid | Brownish yellow. |
| 2-naphthylamine-5.7-disulfonic acid | do | Do. |
| 2-naphthylamine-6.8-disulfonic acid | do | Brownish-orange yellow. |
| 2.5-dichloraniline | do | Brownish yellow. |
| 2-chloraniline-4-sulfonic acid | 2-methylaminonaphthalene-7-sulfonic acid | Red. |
| 4'-nitro-4-aminodiphenylamine-2'-sulfonic acid | Phenyl-2-naphthylamine-6-sulfonic acid | Brown. |
| m-Nitraniline | 2-aminonaphthalene-3.6-disulfonic acid | Brownish yellow. |
| Do | 2-naphthylamine-5.7-disulfonic acid | Do. |
| o-Chloraniline | do | Do. |
| 5-chloro-2-toluidine | do | Reddish yellow. |
| m-Acetylamino-1-aminobenzene | do | Dull yellow. |
| Aminoazobenzene-sulfonic acid | do | Red. |
| Aminoazobenzene-disulfonic acid | 2-naphthylamine-6-sulfonic acid | Reddish bordeaux. |
| Do | 2-naphthylamine | Violet. |
| 4-nitraniline-2-sulfonic acid | Phenyl-2-naphthylamine-6-sulfonic acid | Do. |

Of the above starting materials, 4-acetylethylamino-2-amino toluene is obtainable from p-toluidine by ethylation, acetylation and nitration, the nitro group being subsequently reduced to the amino group.

4'-nitro-4-aminodiphenylamine-2'-sulfonic acid is obtainable by condensing 4-nitro-1-chlorobenzene-2-sulfonic acid with p-phenylenediamine.

Besides the excellent dyeing in obtained in a neutral bath, the dyestuffs have in general a good stability and fastness to alkalis and acids.

The dyestuffs in question, besides being suitable for chrome leather, are particularly suitable for dyeing other kinds of leather, especially vegetable and semichrome tanned leather. Of course, they can also be used together with other suitable acid or substantive dyestuffs.

We claim:

1. Leather dyed with a dyestuff of the general formula

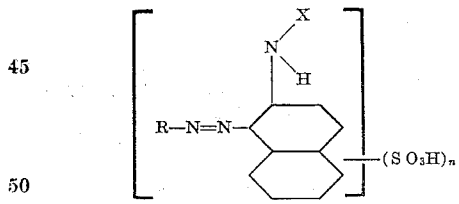

in which R—N=N— stands for a member selected from the group consisting of radicals of diazo and diazoazo compounds of aniline and naphthylamine and their halogen, nitro, alkyl, alkoxy, acylamino, alkylamino and arylamino substitution products, X stands for one of the group consisting of hydrogen, methyl and phenyl and $n$ stands for a whole number.

2. Leather dyed with a dyestuff of the general formula:

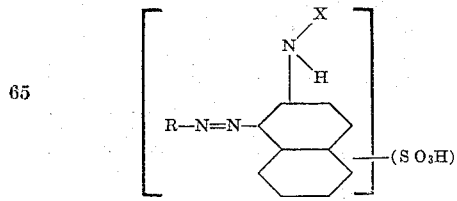

in which R—N=N— stands for a radical of a diazo compound of the benzene series, X stands for one of the group consisting of hydrogen, methyl and phenyl, and $n$ stands for a whole number.

3. Leather dyed with a dyestuff of the general formula:

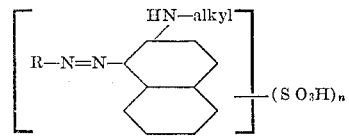

in which R—N=N— stands for a radical of a diazo compound of the benzene series, and $n$ stands for a whole number.

4. Leather dyed with a dyestuff of the general formula:

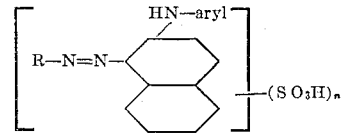

in which R—N=N— stands for a radical of a diazo compound of the benzene series, and $n$ stands for a whole number.

5. Leather dyed with a dyestuff of the general formula:

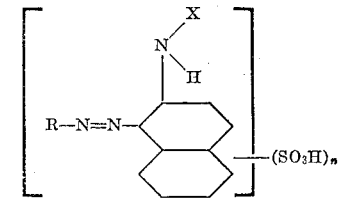

in which R—N=N— stands for a radical of a diazo compound of the naphthalene series, X stands for one of the group consisting of hydrogen, methyl and phenyl, and $n$ stands for a whole number.

6. Leather dyed with a dyestuff having in the free state the following formula:

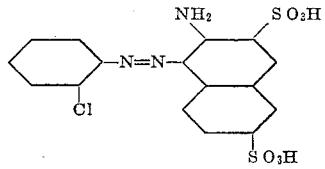

ERNST FELLMER.
GUSTAV MAUTHE.
HERMANN NOERR.